(12) United States Patent
Hutchison (10) Patent No.: US 8,217,305 B2
(45) Date of Patent: *Jul. 10, 2012

(54) SYSTEM AND METHOD FOR IMPROVED TIG ARC STARTING

(75) Inventor: Richard Hutchison, Iola, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1189 days.

This patent is subject to a terminal disclaimer.

(21) Appl. No.: 11/950,982

(22) Filed: Dec. 5, 2007

(65) Prior Publication Data

US 2009/0145889 A1  Jun. 11, 2009

(51) Int. Cl.
*B23K 9/067* (2006.01)
(52) U.S. Cl. ............................ 219/138; 219/75; 219/144
(58) Field of Classification Search .................. 219/74, 219/75, 124.03, 144, 121.48, 121.5, 121.52, 219/121.57
See application file for complete search history.

(56) References Cited

U.S. PATENT DOCUMENTS

| | | | |
|---|---|---|---|
| 2,516,016 A | | 7/1950 | Pakala |
| 3,086,103 A | * | 4/1963 | Hackman et al. ............... 219/74 |
| 3,284,609 A | | 11/1966 | Allen et al. |
| 3,431,390 A | | 3/1969 | Manz |
| 3,646,310 A | | 2/1972 | Manethou |
| 3,809,850 A | * | 5/1974 | Saenger, Jr. ............... 219/121.45 |
| 3,832,513 A | * | 8/1974 | Klasson ........................... 219/75 |
| 4,057,064 A | * | 11/1977 | Morrison et al. ............... 606/49 |
| 4,146,772 A | * | 3/1979 | Jelmorini ................. 219/121.46 |
| 4,205,215 A | * | 5/1980 | Willems .................... 219/121.36 |
| 4,410,788 A | * | 10/1983 | Summers et al. .......... 219/130.1 |
| 4,493,969 A | | 1/1985 | Legrand et al. |
| 4,851,636 A | * | 7/1989 | Sugimoto et al. ........ 219/121.59 |
| 4,855,566 A | | 8/1989 | Hays et al. |
| 5,086,208 A | | 2/1992 | Haberman |
| 5,464,958 A | * | 11/1995 | Flowers et al. .......... 219/130.51 |
| 6,137,079 A | | 10/2000 | Vincent et al. |
| 7,329,833 B2 | * | 2/2008 | Hutchison et al. ......... 219/130.4 |
| 2004/0149704 A1 | * | 8/2004 | Hewett et al. ............. 219/121.57 |
| 2006/0054609 A1 | | 3/2006 | Matthews et al. |
| 2006/0175299 A1 | | 8/2006 | Hutchison et al. |
| 2007/0210035 A1 | * | 9/2007 | Twarog et al. ............. 219/121.5 |
| 2008/0083713 A1 | * | 4/2008 | Sanders .................... 219/121.57 |

FOREIGN PATENT DOCUMENTS

| | | |
|---|---|---|
| DE | 3711989 A1 | 10/1988 |
| GB | 695077 A | 8/1953 |
| GB | 1325539 A | 8/1973 |
| JP | 2001-138051 | 5/2001 |
| SU | 1655696 A | 6/1991 |
| SU | 1655696 A1 * | 6/1991 |

OTHER PUBLICATIONS

PCT/US2008/079902 International Search Report.
Database WPI Week 199219, Thomson Scientific, London GB; AN 1992-158097; XP00250953.

* cited by examiner

*Primary Examiner* — Joseph M Pelham
(74) *Attorney, Agent, or Firm* — Quarles & Brady LLP (57) ABSTRACT

A system and method for performing a welding-type process includes a welding-type torch having a first electrode connected to receive a welding-type power to effectuate a welding-type process. The welding-type torch also includes a second electrode connected to receive a starting power to initiate the welding-type process and a nozzle surrounding at least a portion of the first electrode.

7 Claims, 8 Drawing Sheets

SYSTEM AND METHOD FOR IMPROVED TIG ARC STARTING

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to welding-type systems and, more particularly, to an apparatus for improved high-frequency arc starting of a welding process.

There are a large number of welding processes available for use in industry. For example, some welding processes include gas tungsten arc, oxygen gas welding, and shielded metal arc welding. The gas tungsten arc welding process is generally referred to as tungsten inert gas (TIG) welding. A typical TIG welding apparatus includes a welding component that is commonly referred to as welding torch and is designed to control a tungsten electrode during a welding process. The electrode is heated to extremely high temperatures by electrical power received from the power supply. At appropriate voltage and current, a welding arc is created between the electrode and a workpiece to be welded.

It is well known that TIG welding is often preferably started using a high-frequency (HF) starting system. High-frequency starting is a method of generating an arc without moving parts or the wear associated with shorting and breaking. To perform HF starting, a welding torch is connected to a power supply having an HF starting circuit. The circuit typically includes a high-voltage transformer, capacitors for power conditioning, and a nozzle assembly configured to generate a high-voltage spark at the torch electrode. When sufficient voltage is provided by the power supply to the torch, a spark fires from the electrode and traverses a gap between the electrode and the workpiece.

However, while HF starting systems serve to protect the electrode from the wear associated with shorting and breaking of a contact starting system, it is often less reliable than contact starting systems. For example, it is not uncommon that HF starting of a TIG welding process may fail on more than 25% of starts.

As such, some operators have attempted to improve the reliability of HF starting by decreasing the distance between the electrode and workpiece during the HF start. However, as the gap between the electrode and workpiece is decreased, the probability of the electrode contacting the workpiece increases. Should the electrode strike the workpiece, the advantage of decreased wear afforded by HF starting is removed. Furthermore, in TIG welding processes, should the tungsten electrode strike the workpiece, some of the tungsten may be transferred to the workpiece and reduce the integrity of the weld.

Accordingly, some operators have designed a way to "move" the workpiece electrically closer to the electrode without reducing the gap between the electrode and the workpiece. That is, some operators have connected a wire from the workpiece to the nozzle where it is clamped thereto. While this piecemeal system increases HF starting performance it has many drawbacks.

Specifically, the system is insecure, unstable, and may be unintentionally separated or dismantled during normal welding operations. That is, these systems are prone to inadvertently disassembly because the wire connecting the workpiece to the nozzle is merely clamped in place and dangling from the welding torch. As such, the wire may be inadvertently removed from the clamp or may interfere with the welding process. Furthermore, the clamp may obscure the operator's view of the workpiece or interfere with the welding process. Additionally, the clamp may be easily moved or dislodged from the nozzle during normal welding operations.

Also, the clamp securing the wire to the nozzle, while integral in creating the advantages of these piecemeal systems, is undesirable. That is, the clamp is electrically charged and, therefore, creates a system that may not comply with applicable workplace standards and regulations.

Furthermore, the welding cable and the wire connecting the workpiece and nozzle carry a potential difference equal to the potential difference between the tungsten electrode and the workpiece desired for effectuating a welding process. This relatively high potential difference can result in leakage of the HF voltage and diminish the peak voltage available to establish an initial welding arc if the welding cable and the wire leading from the workpiece to the nozzle are too close in proximity.

Therefore, it would be desirable to have a system and method for improving the consistency of HF starting that does not interfere with initiating a welding arc, does not interfere with the welding process, is not susceptible to inadvertent movement or disassembly, and is compliant with acceptable workplace standards and regulations.

BRIEF SUMMARY OF THE INVENTION

The present invention overcomes the aforementioned drawbacks by providing a high-frequency arc starting system that includes at least one electrode that is specifically designed to initiate a welding process. The system may be integrated into a nozzle assembly and retrofitted into traditional welding torches.

In accordance with one aspect of the present invention, a welding-type torch is disclosed that includes a first electrode connected to receive a welding-type power to effectuate a welding-type process. The welding-type torch also includes a second electrode connected to receive a starting power to initiate the welding-type process and a nozzle surrounding at least a portion of the first electrode.

In accordance with another aspect of the present invention, a welding torch nozzle assembly is disclosed that includes a first electrode having a first diameter and formed of a first material capable of receiving a welding-type power and effectuating a welding-type process. The welding torch nozzle assembly also includes a second electrode having a second diameter, which is less than the first diameter, and formed of a second material configured to initiate a corona discharge proximate to the first electrode to initiate the welding-type process between the first electrode and a workpiece.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
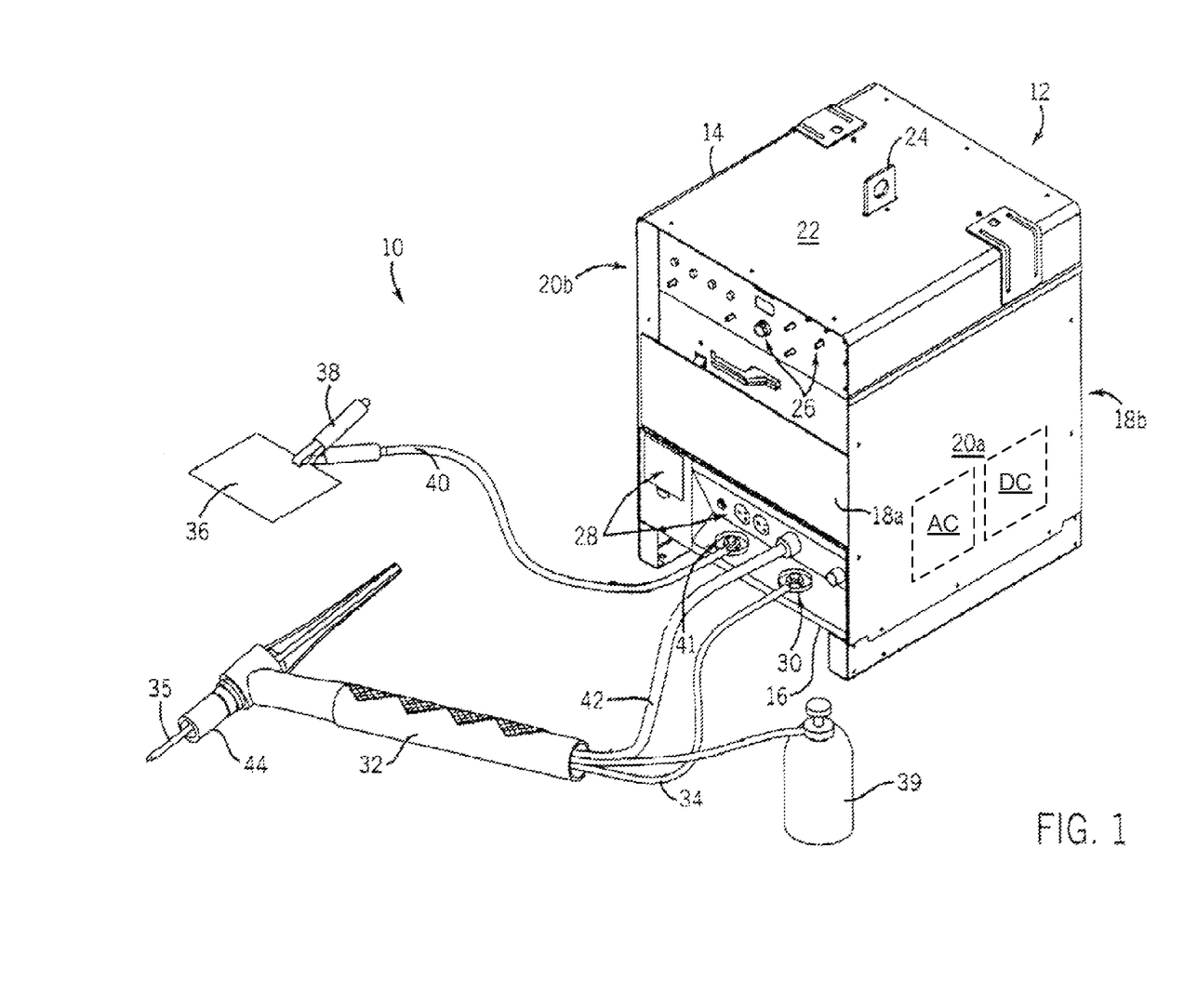
FIG. 1 a perspective view of a welding-type system incorporating the present invention.

Referring now to FIG. 1, a welding-type system 10 suitable for a number of welding processes, including tungsten inert gas (TIG) welding, includes a power supply 12 disposed within an enclosure 14. The power supply 12 is configured to condition raw power, for example from a transmission power line, into a power suitable for welding. The enclosure 14 is defined by a base 16, front and back panels 18a, 18b, and a pair of side panels 20a, 20b attached to the base 16. A top cover 22 having a handle 24 is secured to the pair of side panels 20a, 20b to form the enclosure 14. The front panel 18a includes control knobs 26 and outlets and receptacles 28 to facilitate the connection of welding accessories to the power supply 12. A welding torch output terminal 30 provided to connect a torch 32 to the power supply 12 via welding cable 34. The torch 32 is designed to hold a tungsten electrode 35. To complete a welding circuit, a clamp 38 is provided to connect a workpiece 36 to the power supply 12 via a cable 40 and workpiece output terminal 41. A gas cylinder 39 is used to store gas that is delivered to the torch 32 during the welding process.

In addition to the power supply 12, the enclosure 14 may also house an optional cooling system (not shown) designed to regulate the temperature of the torch 32 and the component internal to the enclosure 14. In this regard, the optional cooling system is designed to circulate coolant to and from the torch 32 via a coolant conduit or path 42.

As will be described, the welding torch 32 includes an integrated HF starting system configured to improve HF starting performance and consistency. Specifically, as will be described, a nozzle assembly 44 is provided that surrounds the tungsten electrode 35 and, as will be described, one or more additional electrodes specifically designed to perform a HF starting process.

Figure 2:
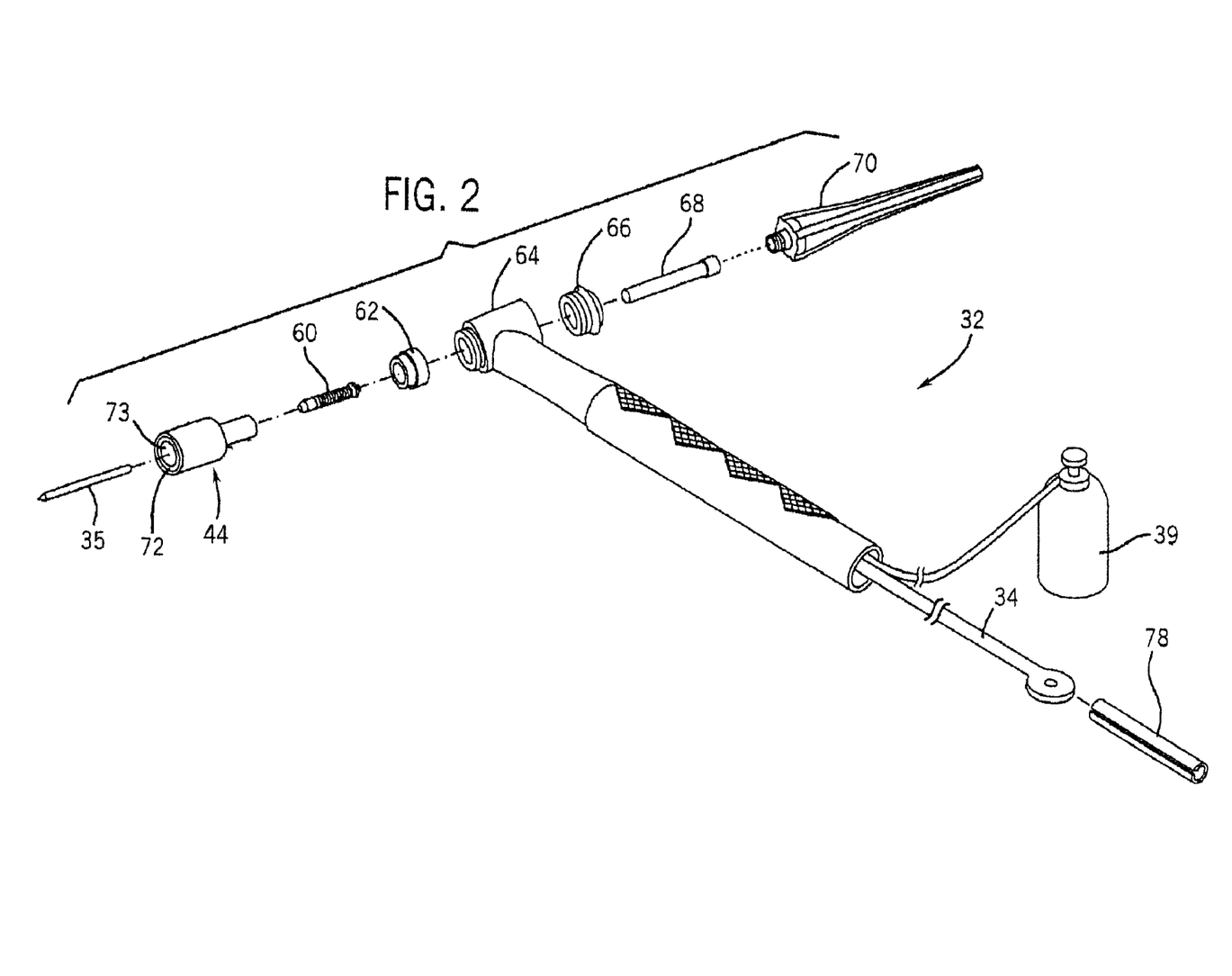
FIG. 2 is an exploded view of the welding torch of FIG. 1 incorporating the present invention.

Referring now to FIG. 2, an exploded view of the welding torch 32 of FIG. 1 is shown. The welding torch 32 includes the tungsten electrode 35 that is configured to be partially surrounded by the nozzle assembly 44. As will be described, the nozzle assembly 44 may include multiple configurations. A collet body 60 is configured to engage the electrode 35 and pass through a heat shield 62, a torch body 64, and backcap insulator 66 to engage a collet 68. The collet 68, in turn, engages a backcap 70.

The nozzle assembly 44 is formed of multiple components. The nozzle assembly 44 includes a non-conductive nozzle 72 that, for example, may be formed of porcelain or ceramics. The non-conductive nozzle 72 defines a hollow or open inner portion or chamber 73. In this regard, the non-conductive nozzle 72 may be formed as a cylinder to allow the tungsten electrode 35 to pass therethrough. It is contemplated, however, that the non-conductive nozzle 72 may be formed in other geometrical shapes, such as frusto-conical shape.

Figure 3:
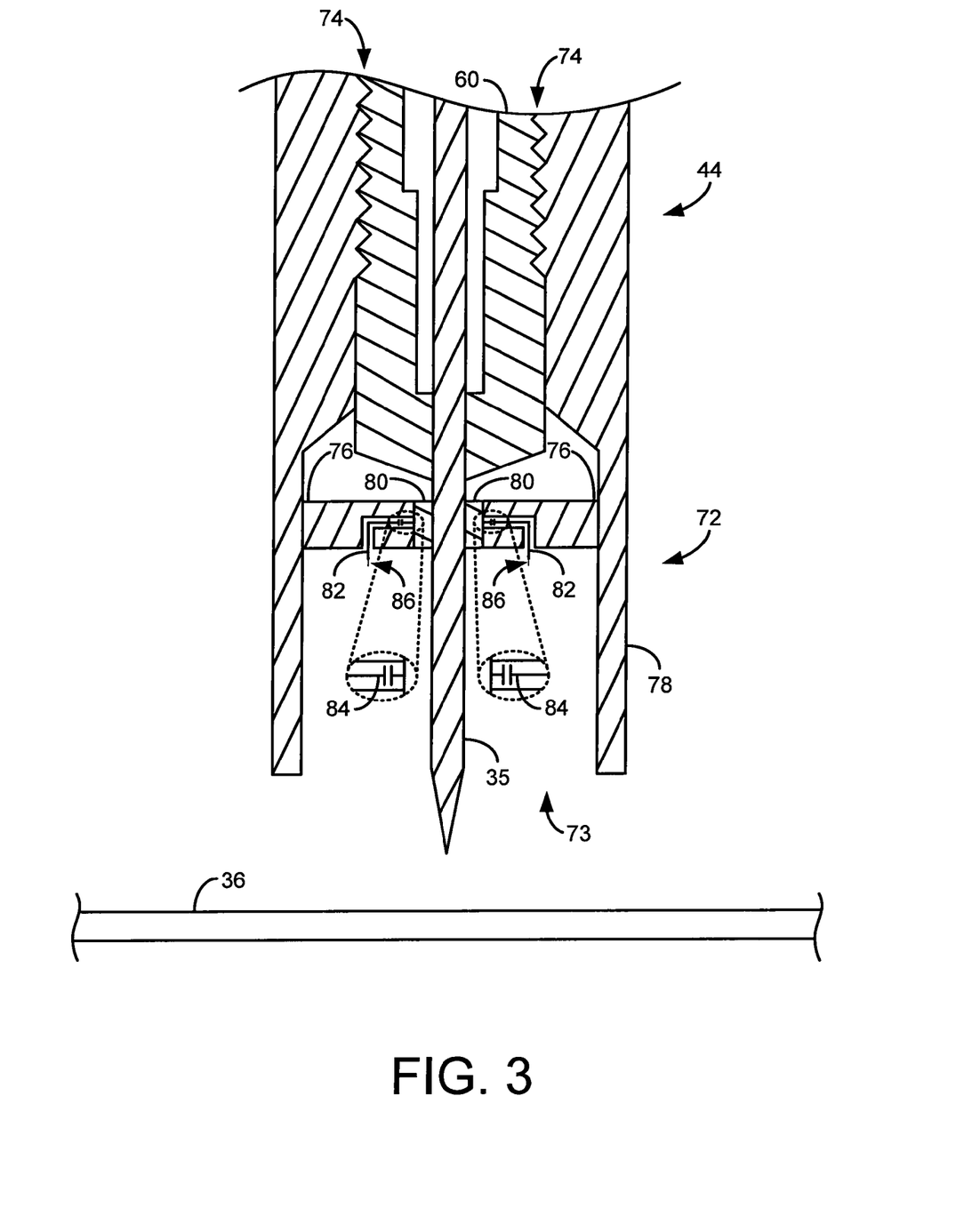
FIG. 3 is a cross-sectional view of the nozzle of FIGS. 1 and 2 incorporating one embodiment of the present invention.

Referring now to FIG. 3, the nozzle assembly 44 includes the nozzle 72 that engages the collet body 60 through a complementary threading 74. The collet body 60, in turn, engages the collet 68 which subsequently engages the tungsten electrode 35 and, as described above, provides welding-type power to the electrode 35 to effectuate a welding-type process, such as a TIG welding process. In accordance with the configuration illustrated in FIG. 3, the nozzle assembly 44 includes a nozzle 72 including a bridge 76 that extends from an outer wall 78 toward the tungsten electrode 35. A coupling 80 connects the bridge 76 to the tungsten electrode 35. As described above, the nozzle 72 and, thus, the bridge 76 are non-conductive. However, the coupling 80 provides a conductive path from the electrode 35. Connecting therefrom is a pair of starting electrodes 82. The starting electrodes 82 are electrically coupled to the tungsten electrode 35 through the coupling 80 and, preferably, a filter 84. As illustrated, the filter 84 may be a capacitive filter such that, as will be described, DC or low frequency AC welding-type power configured to effectuate a desired welding-type process is restricted from reaching the electrode 82, while HF, AC starting power passes therethrough.

The starting electrodes 82 extend from the coupling 80, through the bridge 76 and into the opening 73 in the nozzle 72. In this regard, the starting electrodes 82 are arranged proximate to the tungsten welding electrode 35 and the workpiece 36. The starting electrodes 84 are specifically designed for initiating a corona discharge proximate to the tungsten electrode 35 and, thereby, starting a desired welding-type process. Specifically, the starting electrodes have a diameter that is less and, preferably, significantly less than the tungsten electrode 35. Furthermore, the starting electrodes are preferably composed of at least one material specifically selected to initiate a welding-type process. For example, it is contemplated that the electrode may be made of nickel and chromium. Further still, the starting electrodes preferably have a substantially sharp tip 86 that is further designed to aid in initiating the desired welding process. Also, the starting electrodes 82 may include a high field emissive coating about a perimeter of the electrodes 82, such as a diamond coating or carbon nanotube.

This design of the starting electrodes 82, which is specifically selected for starting operations, yields an electrode that is not suitable for welding processes. In accordance with one embodiment, the starting electrodes 82 have a diameter and are composed of materials that are preferable for starting processes but that cannot withstand welding powers. For example, in accordance with some embodiments, the starting electrodes 82 may be destroyed if power for effectuating a welding process is delivered to the electrodes 82. Accordingly, the filter(s) 84 is designed to protect the starting electrodes 82 from receiving welding-type power, which is typically DC or low frequency AC power, and will only receive the HF, AC starting power. Furthermore, the nozzle 72 and bridge 76 are designed to protect the starting electrodes 82 from accidental damage, for example, as a result of impact with the workpiece 36. That is, the starting electrodes 82 are recessed within the opening 73 within the nozzle 72 and, thus, are protected against accidental impacts. Accordingly, the starting electrodes 82 may have a very fine tip 86 that is protected against damage that may be caused by welding-type power or impact by the filter 84 and nozzle 72.

As gas is supplied from the gas bottle 39 of FIG. 1 or other gas supply, the potential difference between the starting electrode 82 and the workpiece 36 aids in the creation of a plasma discharge of the gas supplied to the nozzle assembly 44. The plasma discharge creates ultraviolet (UV) light having sufficient energy to overcome the work function of the electrode. Accordingly, by way of the photoelectric effect, an electron is dislodged directed toward the workpiece 36. This dislodged electron initiates an avalanche of electrons to form a spark between the electrode and the workpiece.

This system advantageously induces these events within the nozzle assembly 44. Accordingly, the probability that the UV light will sufficiently impinge the tungsten electrode 35 to dislodge an electron is increased. As such, HF starting reliability and consistency is improved.

Figure 4:
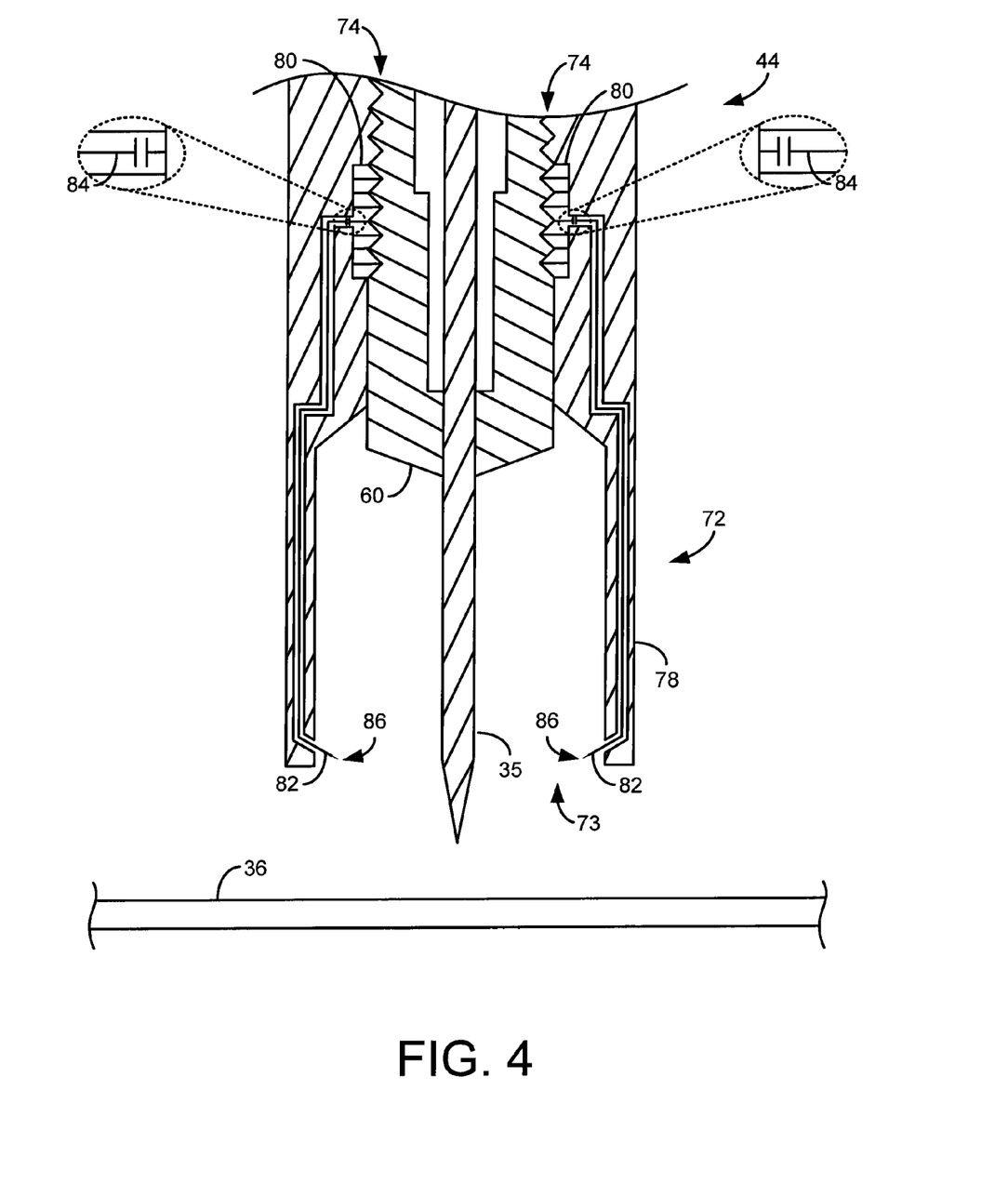
FIG. 4 is a cross-sectional view of the nozzle of FIGS. 1 and 2 incorporating another embodiment of the present invention.

Referring now to FIG. 4, the bridge 76 of FIG. 3 may be foregone and, instead, the starting electrodes 82 extend through the wall 78 of the nozzle 72. In accordance with this design, the coupling 80 engages the collet body 60 to receive the HF starting power from the collet body 60, instead of directly from the tungsten electrode 35, as in the configuration shown in FIG. 3. As illustrated in FIG. 4, the coupling 80 may be integrated into the nozzle 72 along the threadings 74. However, it is contemplated that the coupling 80 may be arranged along interface with the collet body 60 to receive the HF starting power from the collet body 60.

In this arrangement, the filter 84 may be arranged proximate to the coupling 80 or elsewhere along the starting electrodes 82. The starting electrodes 82 extend through the wall 78 of the nozzle 72 and exit therefrom into the opening 73 proximate to the tungsten electrode 35.

Figure 5:
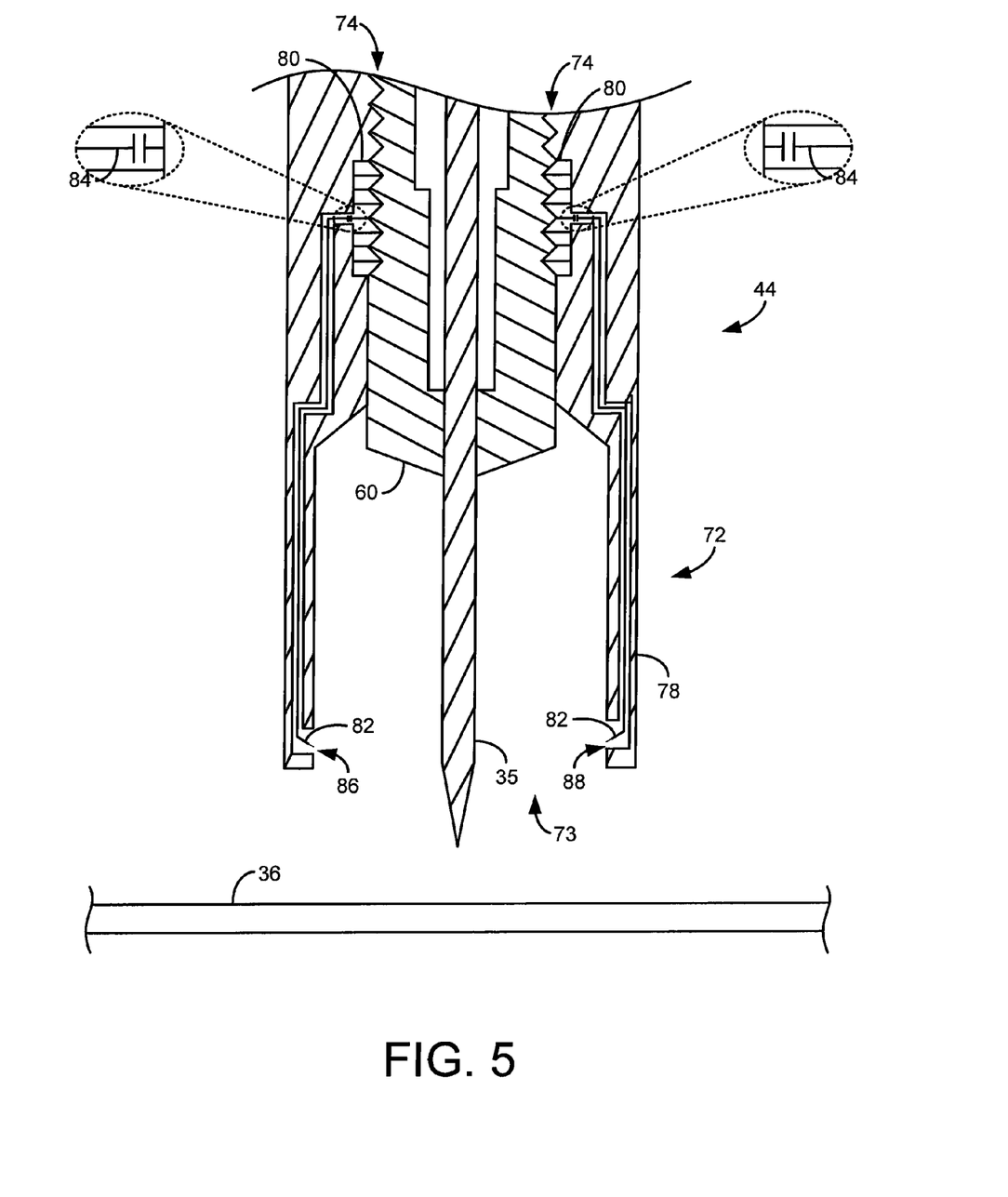
FIG. 5 is a cross-sectional view of the nozzle of FIGS. 1 and 2 incorporating one other embodiment of the present invention.

As illustrated in FIG. 4, the starting electrodes 82 may extend out from the wall 78 of the nozzle 72 both toward the tungsten electrode 35 and the workpiece 36. Also, as illustrated in FIG. 5, the wall 78 of the nozzle 72 may include a recess 88 within which the starting electrodes 82 are arranged. In this arrangement, the starting electrodes 82 and, in particular, the tip 86, are further protected against accidental damage by the wall 78 of the nozzle 72.

Figure 6:
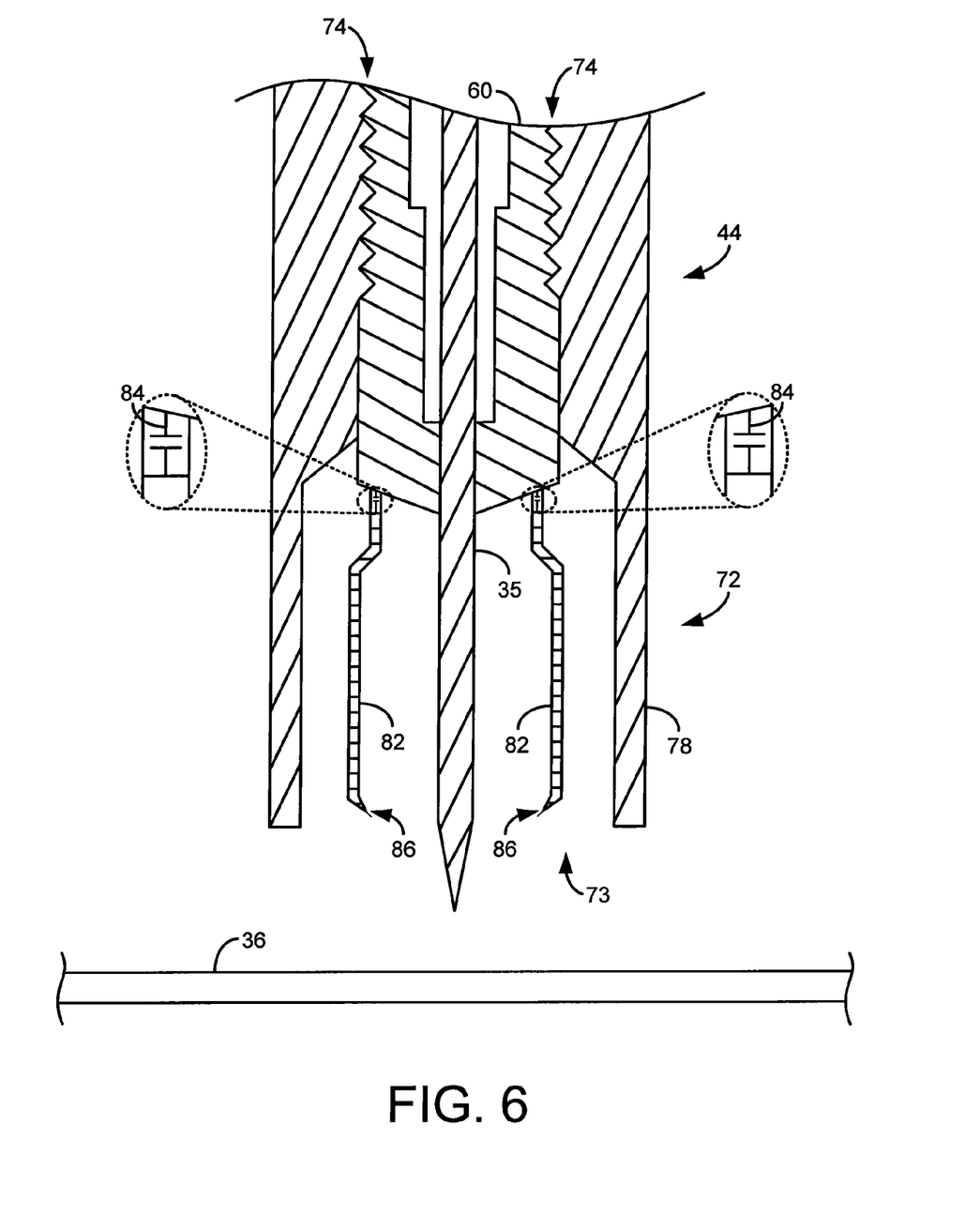
FIG. 6 is a cross-sectional view of the nozzle of FIGS. 1 and 2 incorporating still another embodiment of the present invention.

Referring now to FIG. 6, it is contemplated that the starting electrodes 82 may extend directly from the collet body 60 through the opening 73. In this arrangement, the starting electrodes 82 can be arranged in closer proximity to the tungsten electrode 35. To ensure that the starting electrodes 82 maintain the desired relative proximity, the starting electrodes 82 may have an increased diameter and structural integrity. Accordingly, to further improve starting consistency, the starting electrodes 82 may include highly refined tips 86 that extend toward both the tungsten electrode 35 and the workpiece 36.

Figure 7:
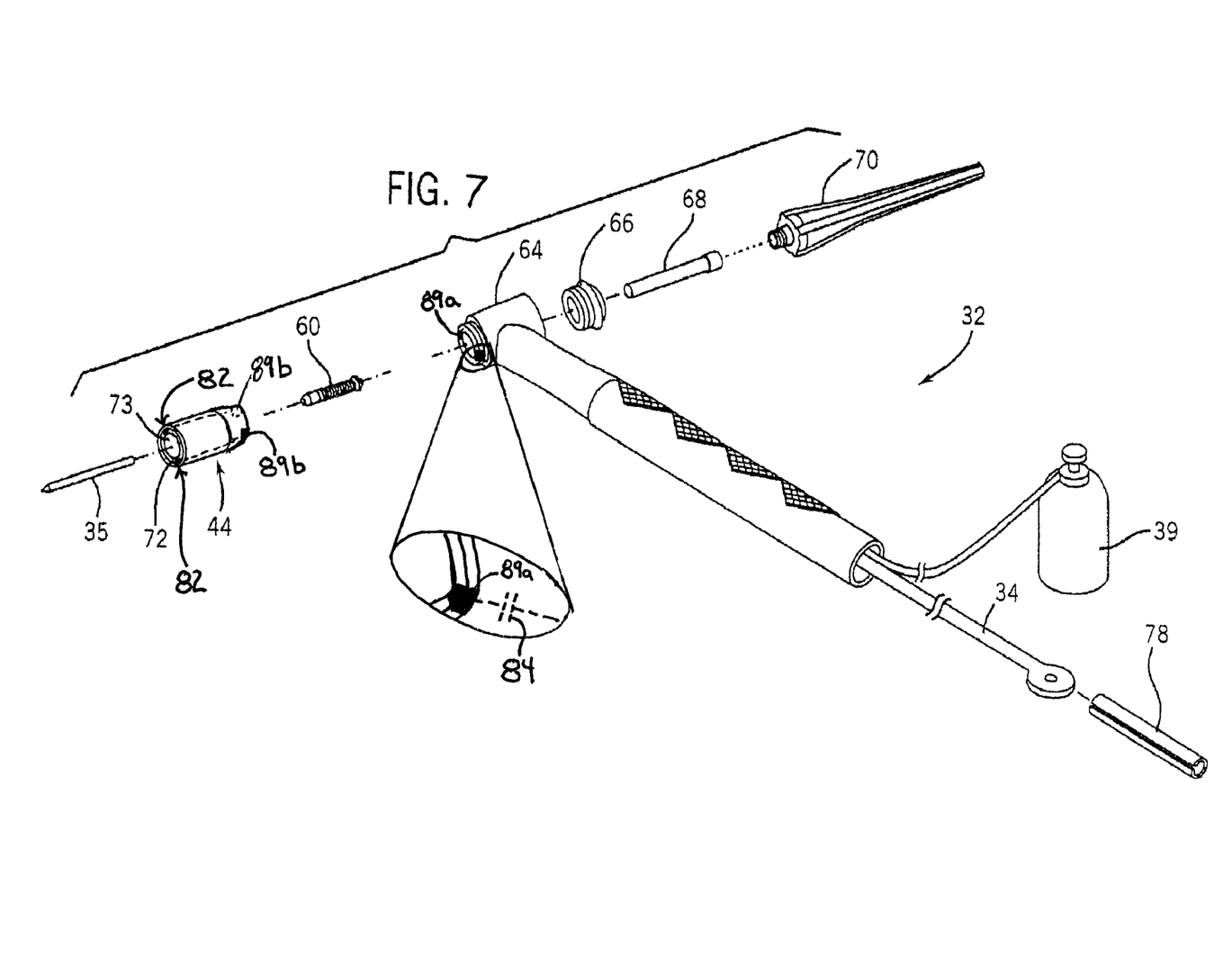
FIG. 7. is an exploded view of another embodiment of the present invention.

Referring now to FIG. 7, an exploded view of a torch similar to that of FIG. 2. However, in this configuration the filter 84 is moved into a body or handle of the welding torch 32. Accordingly, the filter 84 is removed from the temperature extremes that must be tolerated when in close proximity to the nozzle assembly 44. It is contemplated that the filter 84 may be electrically coupled to the welding cable 34 extending through the body or handle of the welding torch 32 and terminate at an end of the torch body 64 configured to receive the nozzle assembly 44. To this end, one or more sets of reciprocal conductive pads 89a and 89b may be formed in the torch body 64 and nozzle 72, respectively. When the nozzle assembly 44 is engaged with the torch body 64, the reciprocal conductive pads 89a and 89b align to provide a conductive path from the filter 84 into the nozzle 72. In a manner similar to that described above with respect to FIGS. 4 and 5, one or more staring electrodes 82 extend through the body of the nozzle 72 and proximate to the tungsten electrode 35 to aid in starting the desired welding-type process. In fact, it is contemplated that the conductive-pad coupling system illustrated in FIG. 7 may be combined with any of the above-described configurations.

Figure 8:
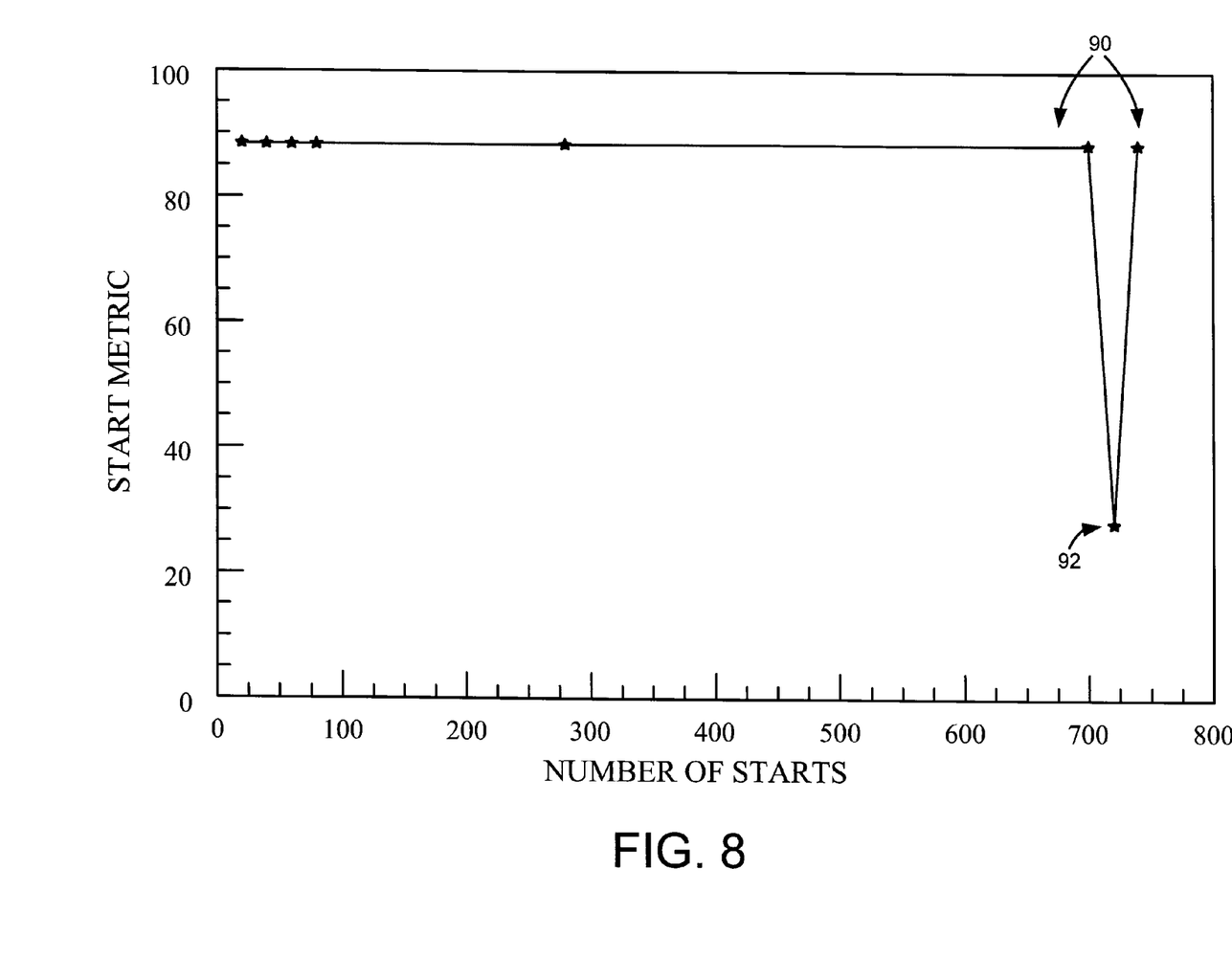
FIG. 8 is a graph showing the unexpected results yielded by the present invention.

Turning now to FIG. 8, a graph of start metric versus number of starts illustrates the effective and unexpected results of using the above-described invention, as opposed to known HF starting systems. Specifically, the graph shows that, despite the number of starts, with the above-described system in place, as indicated by arrow 90, highly consistent starts are achieved. On the other hand, when the starting electrodes of the present invention are disengaged and the tungsten electrodes is used to initiate the welding process, as indicated at arrow 92, the starting consistency decreases significantly.

In the tests performed to derive the data used to create the graph in FIG. 7, the same tungsten electrode was used throughout the tests. Once the arc was initiated, the welding arc was maintained for a duration of 4 seconds. Following thereafter, a 24 second off time was observed before initiating the subsequent start. The welding current was approximately 5 amps and the starting current was approximately 25 amps.

Therefore, a system and method for improved HF starting is provided. The system utilizes at least one electrode that is specifically designed to initiate a welding process. Additionally, the system may be integrated into a nozzle assembly and retrofitted into traditional welding torches.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

I claim:

1. A welding torch assembly comprising:
    a first electrode having a first diameter and formed of a first material capable of receiving a welding power and effectuating a welding process;
    a second electrode having a second diameter, which is less than the first diameter, and formed of a second material configured to initiate a corona discharge proximate to the first electrode to initiate the welding process between the first electrode and a workpiece;
    a nozzle surrounding at least a portion of the first electrode and at least a portion of the second electrode; and
    a back cap detachably supporting the nozzle, the first electrode, and the second electrode.

2. The welding torch assembly of claim 1 wherein the second electrode is electrically connected to the first electrode.

3. The welding torch assembly of claim 2 wherein the second electrode is connected to the first electrode through a filter configured to restrict the welding power from the second electrode.

4. The welding torch assembly of claim 3 wherein the filter includes a capacitor.

5. The welding torch assembly of claim 1 wherein the first material includes tungsten and the second material includes at least one of nickel and chromium.

6. The welding torch nozzle assembly of claim 1 wherein the nozzle is electrically non-conductive and wherein the second electrode extends through a side wall of the nozzle.

7. The welding torch nozzle assembly of claim 6 wherein a tip of the second electrode is recessed in the side wall of the nozzle.

* * * * *